United States Patent [19]

Eizenhöfer

[11] Patent Number: 4,754,453
[45] Date of Patent: Jun. 28, 1988

[54] DIGITAL RADIO TRANSMISSION SYSTEM WITH A CONNECTION-ACCOMPANYING ORGANIZATION CHANNEL IN THE TIME-DIVISION MULTIPLEX FRAME

[75] Inventor: Alfons Eizenhöfer, Altdorf, Fed. Rep. of Germany

[73] Assignee: U.S. Philips Corporation, New York, N.Y.

[21] Appl. No.: 891,984

[22] Filed: Jul. 30, 1986

[30] Foreign Application Priority Data

Jul. 31, 1985 [DE] Fed. Rep. of Germany ....... 3527330

[51] Int. Cl.4 .......................... H04J 3/16; H04Q 7/00
[52] U.S. Cl. ....................................... 370/95; 455/33; 379/63
[58] Field of Search ................. 370/95, 110.1; 455/33, 455/54, 38; 379/59, 60, 63

[56] References Cited

U.S. PATENT DOCUMENTS 4,519,068 5/1985 Krebs et al. ........................... 455/33
4,549,293 10/1985 Christian et al. ...................... 370/95
4,653,049 3/1987 Shiwmyo ............................... 370/95

FOREIGN PATENT DOCUMENTS 2537683 3/1977 Fed. Rep. of Germany .

OTHER PUBLICATIONS

"Mit Digitaltechnik Zum Mobiltelefon Fur Alle", Nachrichten Electric & Telematik; Van Manfred Bohm, 1984; pp. 264–268.

Primary Examiner—Douglas W. Olms
Assistant Examiner—Frank M. Scutch, III
Attorney, Agent, or Firm—Thomas A. Briody; Algy Tamoshunas; William J. Streeter

[57] ABSTRACT

Method of digital radio transmission between a base station and a plurality of mobile stations. A time division multiplexed signal frame is generated, including a plurality of time slots which repeat each frame interval. A beginning number of the time slots form a signalling channel with the remaining following time slots forming a plurality of channels which receive data to be sent. The signalling channels include a common organizational connection for each channel of the frame. Additionally, one of the remaining plurality of channels includes an organizational channel for identifying a larger number of channels than those included in the individual frame. The technique permits a combination of time division multiplexing, spectral multiplexing and carrier frequency multiplexing.

7 Claims, 3 Drawing Sheets

DIGITAL RADIO TRANSMISSION SYSTEM WITH A CONNECTION-ACCOMPANYING ORGANIZATION CHANNEL IN THE TIME-DIVISION MULTIPLEX FRAME

The invention relates to a digital radio transmission system.

There are three known basic methods for sending messages over a transmission medium including transmission lines and, radio channels. These are code-division multiplexing, frequency-division multiplexing and time-division multiplexing.

In the code-multiplexing method the different messages sent over a common transmission medium are imposed by, for example, baseband modulation on a carrier and the resultant narrow-band signal (narrow in relation to the bandwidth of the channel) is spectrally spread over the channel bandwidth by multiplex modulation using a codeword that characterizes the receiver. Recognition of the signal takes place not by time-division or frequency-division selection but on the basis of the spectral coding. The multiply stacked spectrally-coded messages in the code-division multiplex channel are selected in the receiver on the basis of this allocated codeword.

In the frequency-division multiplexing method, the whole bandwidth available for message transmission is divided into narrow frequency bands, each of which corresponds to one message transmission channel. This narrow frequency band is at the disposal of the user for the duration of the message transmission.

In the time-division multiplexing method, each user has available to him the whole bandwidth of a single transmission channel but only for short intervals of time. The characters or sequences of characters of various users are interleaved and are sent out with a correspondingly higher bit rate, the time channel allocated to each user being periodically repeated with the duration of the frame period.

From DE-OS No. 25 37 683 a radio transmission system with base stations and mobile stations is known, in which different channel access methods are used with asynchronous time-division multiplex, code-division multiplex and frequency-division multiplex.

Also known are combinations of the aforesaid methods and their application in a digital radio transmission system. For example, in "Nachrichtentechnik, Elektronik+Telematic 38 (1984), Vol. 7, pages 264 to 268" a digital radio transmission system is described in which the time-division multiplex method is used in combination with spectral coding, but in which the various users are not separated by means of the code-division multiplex method. In the time channels for speech and/or data transmission (TCH communication channel) a bit sequence for establishing the synchronism, a frame-synchronization word and the bit sequence of the message itself are transmitted one after the other. The time channels for message transmission (3×20 TCH) are arranged with organization channels (3 CCH) to form a time-division multiplex frame with a duration of 31.5 msec. If the message to be transmitted is a speech signal, adaptive delta modulation can be used for analog/digital conversion. A code is superimposed on the resultant message characters (bits) in the sender. It has proved advantageous to group the individual message bits into blocks of four bits each and to spread the resultant blocks with an orthogonal alphabet. The spreading factor used is a compromise designed to combine the advantages of band spreading with the requirement to use the frequencies economically.

As appears from the foregoing, two forms of organization channels are generally used in radio transmission systems, in particular in automatic mobile radio systems. The first form relates to a central organization channel, which is frequently designed simply as a central call-channel and the second form relates to an organization channel that accompanies the connection.

In a radio transmission system with channels over which speech and data are transmitted, it is necessary for the organization of the radio transmission channel to be able to exchange information between mobile stations and base stations. Further messages, which are exchanged over the radio transmission channel concern for example information on looking for a mobile station, on the identification procedure, on performing a channel selection procedure, and so on. An organization channel of this kind serves in particular for the procedure of making a connection and, depending on the radio transmission system, is provided either completely or only partially as a central organization channel. Even during an existing connection between users of the public telephone network or of the radio transmission system it is frequently necessary to exchange information on the organization of the radio transmission channel. Such information may relate for example to the form in which a connection should be terminated, to the status of the transmission channel itself, to messages concerning control of the power of a transmitter within the system, to the passing on of a radio connection in cell exchanges to a neighbouring base station, and so on.

The aforesaid exchange of information takes place over what is referred to here as a connection-accompanying organization channel, which is allocated to the radio transmission channel itself. In analog radio transmission systems the organization channel is frequently transmitted in the form of out-band signalling or it is interleaved with the user information to be transmitted, employing the time-division multiplexing method or a suitable channel-coding method.

The implementation with out-band signalling has the disadvantage that the signalling information has to be superimposed on the user information in the sender, for example, by modulation or appropriate coding, so that in the receiver the user and signalling data have to be separated. Moreover the channel capacity for the connection-accompanying organization channel has to be kept in constant readiness, even if at the moment this channel capacity cannot be fully utilized.

If signalling and user data are interleaved in a time-division multiplex frame, similarly as in the formation of multiple frames in a PCM30 transmission system, the channel capacity must again be kept in constant readiness for the signalling information, even though this channel capacity cannot at the moment be fully utilized.

SUMMARY OF THE INVENTION

The object of the invention is to provide means in a digital radio transmission system in which signalling and user data are transmitted over a common radio transmission channel by time-division multiplexing. The data can be easily separated and the channel capacity for the connection-accompanying organization channels is kept as small as possible in order that priority messages from the base station to the mobile stations can be transmitted faster.

The digital radio transmission system according to the invention, in which the connections accompanied by an organization channel in the time-division multiplex frame, has the advantage that through the implementation of the central organization channel accompanying the connection a grouping effect is achieved, which implies that the central organization channel accompanying the connection requires less bandwidth than the sum of the individual channels. It is a further advantage that the separation of signalling and user information can be implemented in a simple manner and that the transmission time is shorter because the bandwidth of the central organization channel accompanying the connection is smaller than the bandwidth of an individual organization channel accompanying the connection. As a consequence, messages with higher priority (e.g. in passing on messages following upon a change of radio cell) can be transmitted faster.

The digital radio transmission system in accordance with the invention is described in more detail in the following with reference to the figures.

DESCRIPTION OF THE PREFERRED EMBODIMENT

Figure 1:
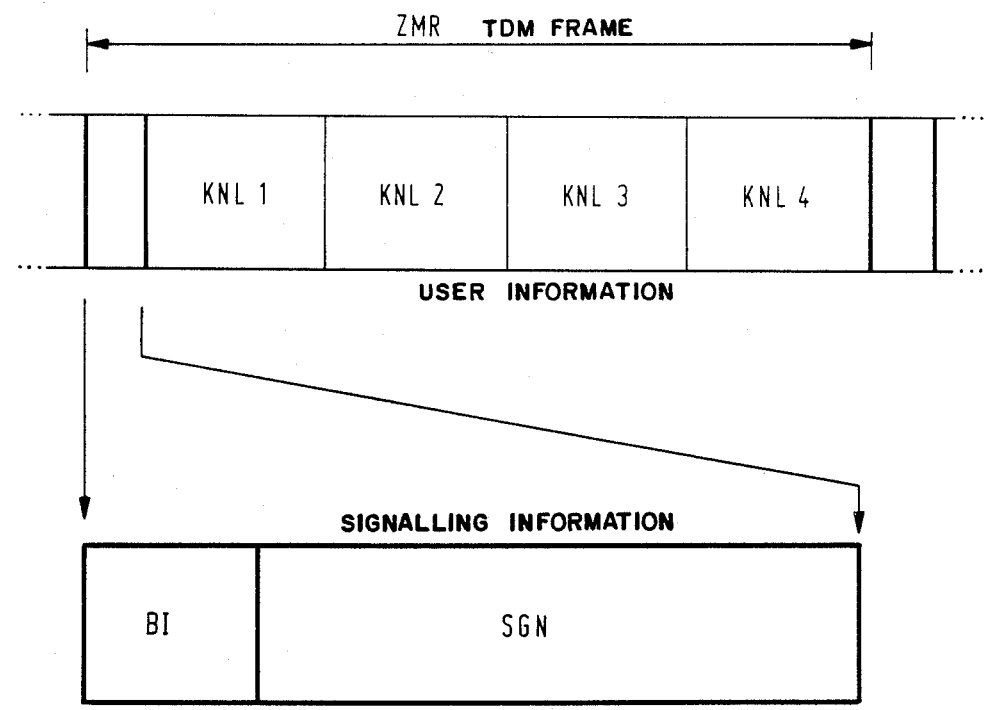
FIG. 1 shows the configuration of the time-division multiplex frame.

The time-division multiplex frame shown in FIG. 1 contains a signalling time slot and four time slots for the transmission of user information pertaining to the users allocated to the relevant time-division multiplex frame. In these time channels 1 to 4 it is possible, for example, to transmit coded speech or data. In addition, one of these time channels 1 to 4 can also be used as a central organization channel. In the signalling time slot, which is provided at the beginning of the time-division multiplex frame, the information of the connection-accompanying organization channel is transmitted.

The distinction between the central organization channel to be transmitted in one of the time channels 1 to 4 and the organization channel accompanying the connection consists in the fact that the central organization channel is available to all users or for a particular user population in a cell of the radio transmission system, whereas the organization channel accompanying the connection is available only to the users allocated to this time-division multiplex frame, where the user population no longer plays any role.

The receiver in the mobile station MS receives the organization channel accompanying the connection and a time slot allocated to it. In order to be able to distinguish between different users of time channels grouped together in a time-division multiplex frame, user identification is also transmitted together with the actual signalling information.

The central organization channel accompanying the connection can be transmitted in radio transmission systems either asymmetrically or symmetrically. Asymmetric transmission means that different combinations of multiplexing methods are used in both transmission directions for the grouping of message channels, whereas in symmetrical transmission the same combinations of multiplexing methods are used. In asymmetrical transmission individual organization channels accompanying the connection are available in the direction from the mobile stations MS to the base stations BS, whereas in symmetrical transmission the same connection-accompanying organization channel is used in both directions.

In the direction from the base station BS to the mobile stations MS allocated to it, it is necessary in symmetrical transmission to organize access to the reverse channel (from the mobile station MS to the base station BS) in order to avoid collisions. This is not necessary in asymmetrical transmission.

Figure 2:
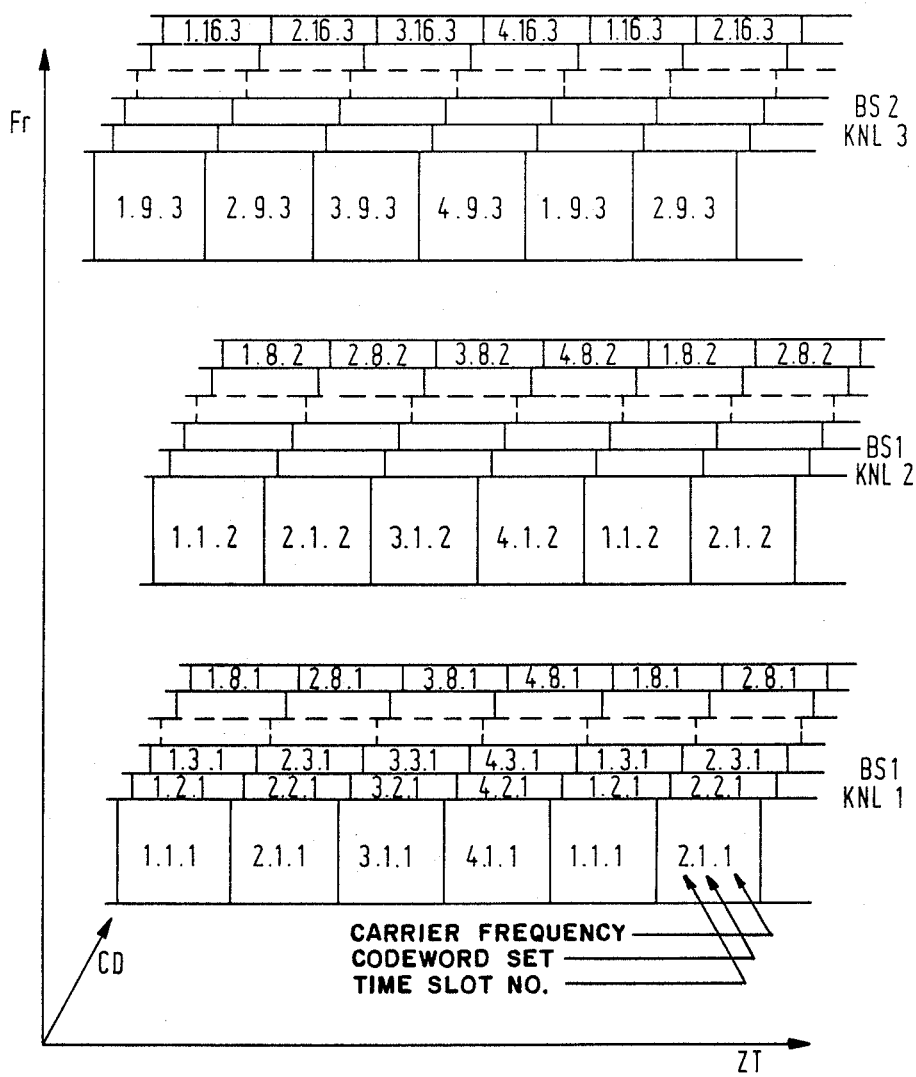
FIG. 2 shows the multiplexing within the radio cells.
Figure 3:
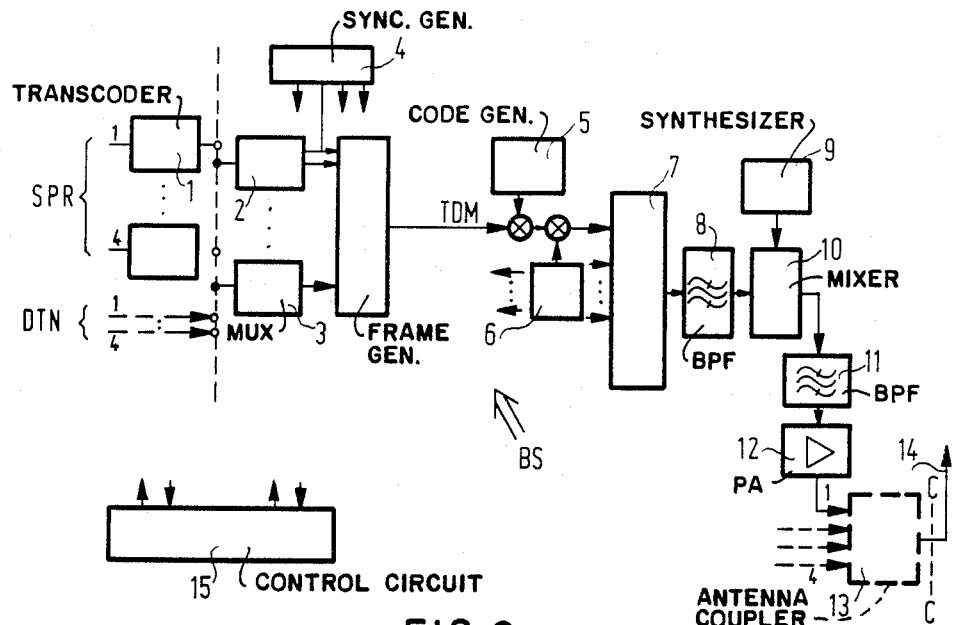
FIG. 3 shows a block diagram of the transmitting part of the base station.
Figure 4:
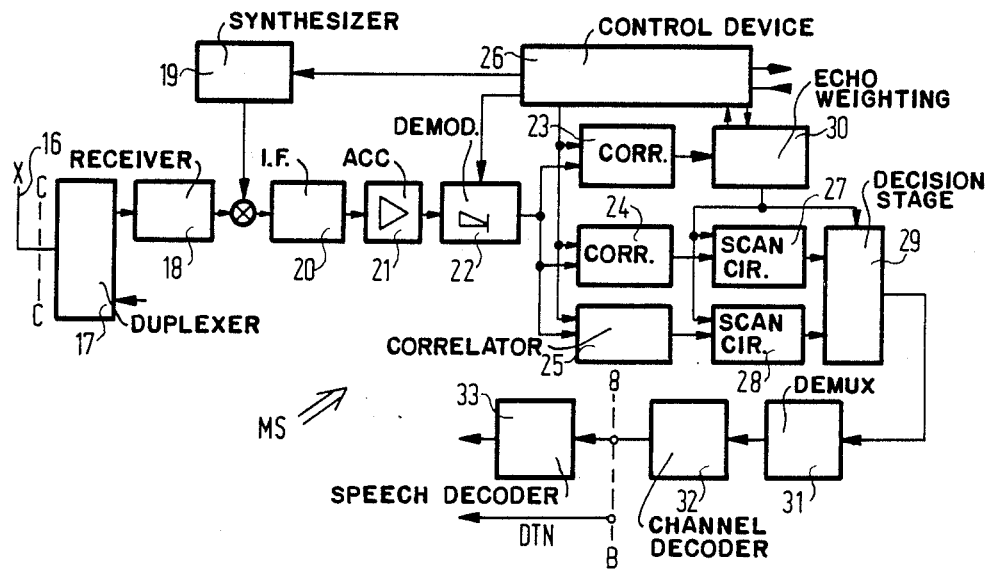
FIG. 4 shows a block diagram of the receiving part in the mobile station.

With reference to FIGS. 2, 3 and 4 a more detailed description will be given of an embodiment of a digital radio transmission system in which different combinations of multiplexing methods are used for grouping the communication channels. The message for transmission is sent from the base station BS to the mobile stations MS in the communication channels using a combination of code-division, time-division and frequency-division multiplexing methods. Messages from the mobile stations MS to the base station BS can for example be sent over narrowband frequency channels which are separated from each other.

In a digital radio transmission system permanent base stations BS are arranged in a cellular configuration. To each base station BS a number of radio communication channels are allocated, over which messages are transmitted to mobile radio stations MS.

In the two transmission directions different combinations of multiplexing methods are used for grouping the communication channels. In the direction of transmission from the base station BS to the mobile stations MS the message to be transmitted (speech or data) is introduced into the communication channels using code-division multiplexing, time-division multiplexing and frequency-division multiplexing methods. For this purpose the base station BS is provided with a TDM multiplexer 3, a codeword generator 5 and a synthesizer 9 (see FIG. 3). In the mobile station MS the communication channels of the received digital signal are separated using the code-division multiplexing, time-division multiplexing and frequency-division multiplexing methods. For this purpose the mobile station MS is provided inter alia with a synthesizer 19, correlators 24 and 25 and a TDM demultiplexer 31 (see FIG. 4). For the direction of transmission from the mobile stations MS to the base station BS the transmission takes place in separated narrowband frequency channels. In the following a description will be given of the multiplexing performed for the direction of transmission from the base station BS to the mobile station MS.

A base station BS has for example at least one set of channels consisting of 32 communication channels. The individual communication channels for the different mobile stations MS in a set of channels are separated from each other by different bandspread codewords (CDMA) and/or different time slots (TDMA). FIG. 2 shows three of such sets of channels, and in the example shown the channel sets 1 and 2 belong to the same cell and channel set 3 belongs to a neighbouring cell. The characterization of the individual communication channels (channel identification) is illustrated in FIG. 2 by the sequence of three-digit numbers. The first digit represents the number of the relevant time slot, the second digit the codeword used, and the third digit the number of the relevant carrier frequency. The grouping of the communication channels in the direction of transmission from the base station BS to the mobile stations MS is effectuated by the consecutive methods of time-division, code-division and frequency-division multiplexing. This preferred sequence facilitates the implementation of the sending and receiving devices in the digital radio transmission system.

A channel set is built up for example by grouping together several time slots, each of which contains the information for one particular user, to form a time-division multiplex frame. In FIG. 2 the time-division multiplex frame comprises four time slots, e.g. communication channel 1.1.1 to 4.1.1. The time-division multiplex frame consists for example of 800 symbols and has a period duration of 20 msec. Of these, 20 synchronization symbols are distributed at regular intervals over the frame. For the organization channel accompanying the connection a number of symbols are provided, preferably at the beginning of the frame. The synchronization bits are not drawn in FIG. 2. As a rule, the time-division multiplex frame is provided with four speech channels each with a useful bit rate of 16 kbits and 3 kbits redundancy. The only fixed data for the formation of a time-division multiplex frame in the digital radio transmission system are the frame length and the situation of the organization channel in said frame.

Next, the information of such a time-division multiplex frame is spread with suitably chosen codewords, which make it possible to transmit simultaneously several time-division multiplex frames with the same carrier frequency. The spreading of each of these time-division multiplex frames is done with a codeword which in this set of channels is allocated to this special time-division multiplex frame only. This means on the one hand that within a channel set each time-division multiplex frame contains for the spreading operation a specific codeword that differs from those of the other time division multiplex frames, and on the other hand that the information in the time slots of a time-division multiplex frame is spread with the same codeword.

In the embodiment shown in FIG. 2 eight different codewords per channel set are used, that is to say a channel set contains eight different time-division multiplex frames each with four time channels, together totalling 32 communication channels per channel set.

By providing selected code symbols for the spreading operation, as for example pseudo-random, orthogonal or quasi-orthogonal codewords, it is possible at the same time to transmit messages in code-division multiplex. The eight individual spreading codes show a spread of 31, that is to say a length of 31 chips. All code-division multiplex channels are thereby transmitted from the sender of the base station BS with the same power and synchronously in time. By using four symbols in each code-division multiplex channel (the four symbols can for example be represented by two antipodal codewords) it is possible to combine two bits of the useful signal to form one signal. This has the effect of halving the symbol rate as compared with the bit rate of the baseband. For the coding of the baseband signal and for synchronization there are six different symbols available, two of which are used exclusively for the synchronization. If eight individual spreading code levels are formed with four time-stacked channels, 32 communication channels of for example 16 kbit/s can be transmitted, which, after code-division spreading, are modulated on a common RF carrier. When four-phase modulation is used, the transmission of 32 communication channels takes e.g. a bandwidth of 1.25 MHz. The time-stacking and hence the number of communication channels per spreading code level depends on the bit rate needed for each message transmission channel.

Due to the combination of every two bits to form one of four possible symbols, the symbol duration of 25 $\mu$s remains sufficiently long to avoid intersymbol interference cause by multipath reception, while on the other hand the outlay on the receiving hardware for the correlator system is low. The 16 spreading codes used within one base station BS to separate the code levels are for example orthogonal pairs, while the different synchronization symbols in several base stations BS with the same carrier should show minimum cross-correlation products for any given time shift.

The spreading c an be performed for example with gold codes. A change in the spreading code has little influence on the receiving equipment, since it contains programmable correlators which can be reset from one connection to another upon instructions from the base station BS. For the transmission of such resetting information and for the separation of the individual time channels (message channels) into time-division multiplex frames, an organization channel can be provided in which the central organization channel and the organization channels accompanying the connection are grouped together.

As already described, the time-division multiplex frames of a channel set are superimposed on one another in the transmitter of the base station BS, given the same amplification and transmitted on an RF carrier via an antenna. In the receiver of the mobile station MS the received digital signal is mixed in baseband. In the time slot allocated to this mobile station when building up the connection the information is then recovered by correlation with the codeword used for this communication channel, which codeword is communicated at the same time to the mobile station. In the receiver of the mobile station MS the separation of the communication channels of the received data signal thus takes place in reverse order, that is to say demultiplexing in terms of frequency, code and time, as in the grouping of the communication channels in the base station BS. Given a frame length of e.g. 20 ms for the time-division multiplex frame, a symbol duration of the spreading codeword of 25 $\mu$s and a spread of 31, the chip duration lies at 0.806 ns and the chip rate at 1.24 Mcps. The chip duration is thus short enough to allow sufficient resolution and utilization of multipaths and to largely eliminate fading effects.

As remarked, at least one common organization channel is provided per set of channels, which is used by the mobile station MS for building up a connection and for the performance of certain special services. The mobile stations MS know the frequency status of the possible channel sets, the relevant time channel and the codewords for the organization channels provided within the digital radio transmission system. With this knowledge a mobile station MS can look for the suitable organization channel for its purposes and can receive all necessary information for operation (e.g. frequency of the narrowband communication from the mobile station MS to the base station BS in the relevant organization channel) and for building up the connection (e.g. time channel and codeword for communication from the base station BS to the mobile station MS, and the frequency for the narrowband communication from the mobile station MS to the base station BS).

If more than 32 communication channels are needed in a base station BS, then several channel sets can be superimposed on each other by frequency-division multiplexing. The different channel sets are transmitted with different RF carrier frequencies. In FIG. 2 the channel sets 1 and 2 are allocated to the base station BS1. For both channel sets allocated to the base station BS1 the same codewords can be used because they are transmitted at different carrier frequencies.

Separation of the communication channels of neighbouring base stations BS is performed either by frequency-division multiplexing (different RF carriers for the channel sets used in these base stations BS), using code-division multiplexing (different codeword sets for the channel sets used) or by combinations of both multiplexing methods. In the embodiment illustrated in FIG. 2 channel set 3 of base station BS2 differs from the two channel sets 1 and 2 of base station BS1 both in codeword set (second digit of channel identification) and in the RF carrier frequency used (third digit in channel identification). With sufficiently large spatial intervals (determined by interchannel interferences) from one cell to another, a channel set (RF carrier and/or codeword set)in the cell can be repeated. The possibility of using the same RF carrier frequency in the remote cell and/or to use different codeword sets results in additional flexibility and freedom in re-use planning and facilitates the introduction of small-cell structures.

For the direction of transmission from the mobile stations MS to the base station BS provision can be made, for example, for narrowband transmission with frequency channels in the 25 kHz raster. In the cells themselves the frequency distribution is not fixed but is left to the decision of the base station BS.

FIG. 3 shows a block diagram of the sending part of the base station BS. The data/speech signals transmitted in baseband are composed as follows. The digitized speech in each channel is first recorded in a transcoder 1 from PCM to the transmission system required for the transmission, with a correspondingly smaller bit rate. At the intersection B—B a data source can be connected. In a channel coder 2 connected to the data source or transcoder 1 special channel coding is added to protect significant bits against transmission errors in the transmission channel. This channel coding may differ, depending on the transmitting service. In a multiplexer 3 connected to channel coder 2 the signalling accompanying the data flow is added, together with the synchronization information from a sync circuit 4. The TDM signal (Time Division Multiplex signal) at the output of the TDM multiplexer 3 thus contains, in the embodiment illustrated in FIG. 3, four speech/data channels, one signalling channel accompanying the connection (for a TDM cluster of channels) and the synchronization bits required for synchronization in the mobile stations MS. The synchronization bits are merged with the TDM channel, as proposed in No. P 35 11 430.4.

The TDM signal at the output of multiplexer 3 is multiplied by the codewords from the relevant code generators 5, whereby two bits are combined to form one signal and are spread with the desired code. The spread signal is modulated by a method adapted to the properties of the transmission channels, whereby for example the spread signal is keyed so as to shift the phase of a carrier signal from an oscillator 6, resulting in a signal carrying the information and the codeword, and which is modulated with a lower intermediate frequency (Binary Phase Shift Keying, BPSK). The modulated CDM signal is fed to an adder 7 whose output is connected to a bandpass filter 8. Eight of these modulated CDM signals, after addition and bandpass filtering, form a multistage-amplitude composite signal which is finally converted to the end frequency.

For this purpose, a mixer oscillator is provided as a synthesizer 9, which can be switched in corresponding stages within the frequency range of the digital radio transmission system. The synthesizer 9 is designed only for the few possible frequencies of the FDM stage (Frequency Division Multiplex stage). Mixing of the CDM signals with the frequency delivered by the corresponding synthesizer 9 is performed in a circuit 10 which is connected to a bandpass filter 11. The output of the bandpass filter 11 is connected to a power amplifier 12, from which the filtered and amplified transmission signal goes via a coupling device 13 to the antenna 14. In smaller base stations BS with up to 32 message transmission channels the antenna coupling device 13 is not required.

A control circuit 15 in the base station BS takes care of the setting of channel and code generators, the correct choice of channel coding and the addition of announcements in the organization data flow. The transmission channel selected for this purpose may be a TDM channel in a CDM plane (see No. P 35 11 430.4).

FIG. 4 shows a block diagram of the receiving part of a mobile station MS. The signal received from a common transmitting/receiving antenna 16 passes through the reception filter of a duplexer 17 to the input stage 18 of the receiver. The requirements to be met by the reception filter of the duplexer 17 are not very stringent, so that mobile stations MS with simple service functions, e.g. simple data signalling, can be relatively inexpensive. In the input stage 18 the signal is amplified and then mixed with a frequency from the synthesizer 19 to form an intermediate-frequency signal.

The intermediate frequency signal is fed to an IF stage 20, where it is further amplified and filtered. As in the case of the synthesizer 19 in the base station BS, a simpler type can be used for the syntehsizer 9 in the mobile station MS, which can be produced more cheaply. The IF stage 20 contains filters which serve to delimit neighbouring channel selection against neighbouring broadband channels and to suppress mixing products in it. The actual noise filtering takes place in correlators 23, 24 and 25. Connected to the IF stage 20 is an amplitude control circuit 21 which raises the output level of the IF stage 20 to a level sufficient to drive the subsequent stages and prevents possible overloading of these circuits. The amplitude control circuit 21 uses estimates to equalize variations in field strength and level fluctuations, thus permitting linear processing of the signals in the subsequent circuits of the mobile station MS. The control time-constant of the amplitude control circuit 21 depends essentially on these estimates.

The power-controlled IF signal at the output of the amplitude control circuit 21 is converted into base-band in a demodulator 22 connected to 21. Using BPSK modulation for example, this can be done in accordance with the Costas loop principle, which applies to both frequency and phase. From the polarity of the received synchronization words it is possible (see No. P 35 11 430.4) to recognize and equalize ambiguities of integral multiples of 180°.

Connected to the demodulator 22 are three correlators 23, 24 and 25 which, by means of a control device 26, can be set for the applicable codes 1 and 2 and for a sync code applicable to the whole set of channels in the transmission zone. The control device 26 also serves for evaluating the organization data signals received, producing a read-out of the data for the services required by users and the data for the transmission channels provided for particular types of equipment, for the selection of switchable transmission channels freely available to the mobile station in the organization data flow, and an access signal for transmission to the base station BS on this selected transmission channel.

The output signal of the correlators 23, 24 and 25 is used on the one hand for deriving the symbol, frame and bit synchronization, and on the other hand for evaluating the instantaneous multipath profile. Since a standard synchronization code of appropriate level is sent out at a same instant in the combined group of channels (see No. P 35 11 430.4) synchronization identification and evaluation of the multipath profile are ensured.

The outputs of the correlators 23, 24 and 25 are connected to scanning circuits 27, 28, which scan the output signals of the correlators 23 to 25 and feed the result to a decision stage 29. The results of the scans performed in the decision stage 29, synchronously with the echoes of the multipath evaluations, are weighted in proportion to the amplitude of the echoes (by a device 30). The decision stage 29 has the task of estimating the transmitted code and the polarity of the code. The estimated value makes it possible to select the symbol that has most probably been transmitted. After the symbol-bit conversion in the decision stage 29, the output signal is fed to a TDM demultiplexer 31 connected to the decision stage 29. The demultiplexer 31 is connected to a channel decoder 32 at the output of which the transmitted data flow is again available. In digital speech transmission the digital speech signal is decoded in a speech decoder 33, in a D/A converter and fed to a connected loudspeaker.

If a mobile station MS has been equipped for example for a data service, the data appearing at the output of the channel decoder 32 can immediately be displayed or printed out.

What is claimed is:

1. A digital radio transmission system in which base stations (BS) and a multiplicity of mutually independent mobile stations (MS) are arranged in a cellular network, and in which the messages for transmission in a common transmission channel are time division multiplexed together wherein, in the transmission direction from the base station (BS) to a respective mobile station (MS) an organization channel accompanying the transmission is provided within the time-division multiplex frame as a central organizatuion channel common to all time multiplexed channels of said multiplex frame for connection data for each data channel contained in said frame.

2. A digital radio transmission system as claimed in claim 1, wherein a central organization channel is provided over which radio messages are transmitted for all users or for specific user populations of the radio transmission system, and that the organization channels accompanying the transmission comprise a common organization channel for all channels in said frame.

3. A digital radio transmission system as claimed in claim 1, wherein user identification is transmitted in addition to signalling information to establish which particular time channel of the time-division multiplex frame is intended for which particular organization channel accompanying the transmission.

4. A method of digital radio transmission between a base station and a plurality of mobile stations, comprising:
generating a time division multiplexed signal frame comprising a plurality of time slots which repeat each frame interval, a beginning number of said time slots forming a signalling channel, the remaining time slots comprising a plurality of data channels;
inserting data in each of said remaining time slots forming data channels to be sent to said plurality of mobile stations;
inserting signalling data in said beginning number of said time slots of each frame which signalling data includes a common organizational connection for all channels of said frame; and,
inserting data into one of said remaining time slots which comprise a central organization channel which is common to a larger number of channels than said channels which include said common organizational connections.

5. The method of claim 4 further including spreading each data channel of each frame with a unique codeword unique to a frame, and simultaneously transmitting different frames of channels identified by different unique codewords.

6. The method of claim 4 wherein each of the time slots comprising said remaining channels includes data identifying said channel by its position in the frame, a codeword for spectrally multiplexing said channel, and a carrier frequency which transmits the frame.

7. The method of claim 6 wherein a plurality of frames are generated forming a set of frames, each frame having a different codeword.

* * * * *